Jan. 4, 1955  K. WEINHOLD  2,698,687
METHOD AND APPARATUS FOR WASHING A FILTER CAKE
Filed Dec. 5, 1949  2 Sheets-Sheet 1
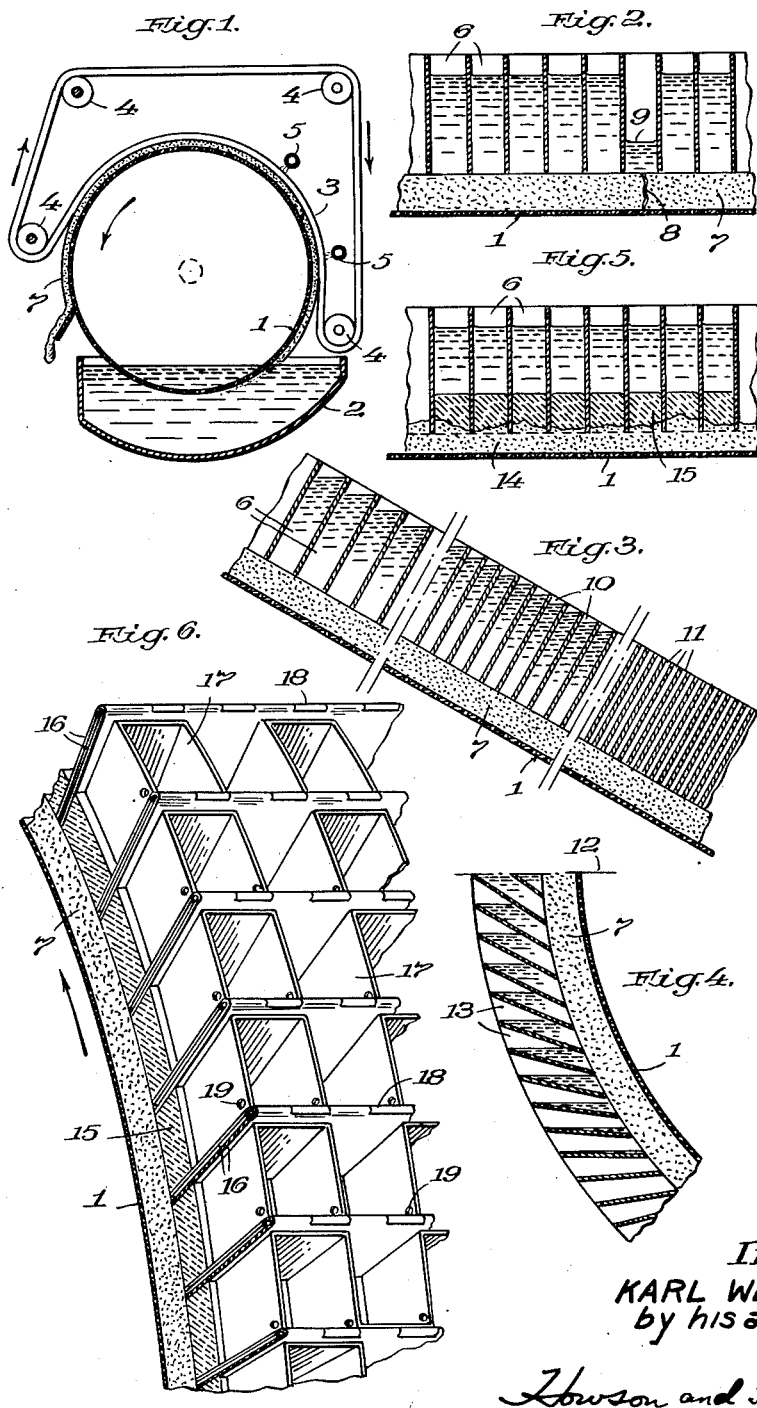
Inventor:
KARL WEINHOLD
by his attorneys
Howson and Howson

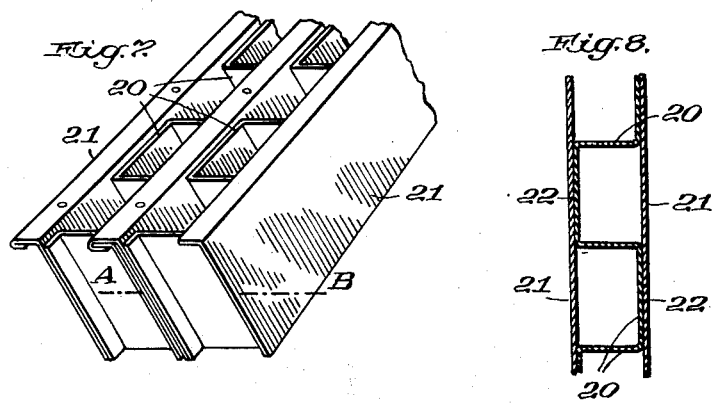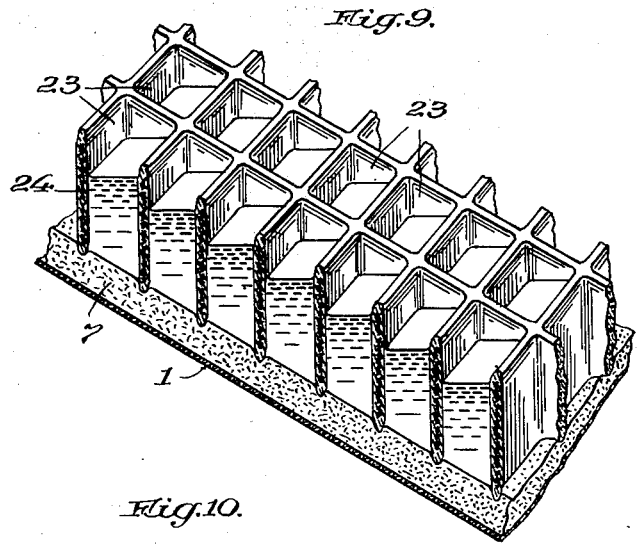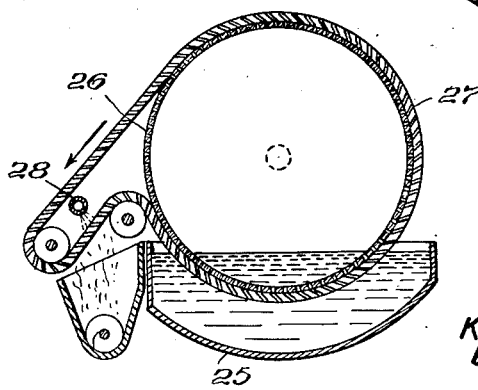

United States Patent Office 2,698,687
Patented Jan. 4, 1955

2,698,687

METHOD AND APPARATUS FOR WASHING A FILTER CAKE

Karl Weinhold, Munich, Germany

Application December 5, 1949, Serial No. 131,200

6 Claims. (Cl. 210—199)

Heretofore when it was desired to wash formed filter cake in a commercial filter having a filter drum, the washing liquid was delivered onto the filter cake from above by pipes, nozzles, distributing channels or similar means. It is essential that the washing liquid be distributed over the surface of the filter cake very evenly so that each portion of the cake receives exactly the required amount of liquid. The pipes and similar means of the prior art cannot do this if the conditions vary. One example of such a change in conditions would be variations in the thickness of the filter cake. If, however, too little washing liquid is fed, an insufficient washing out arises and by contraction of volume of that part of the filter cake it easily cracks and the main quantity of all the washing liquid passes through the cracks. If, on the other hand, too much washing liquid is delivered to the cake, the surplus flows out unused. When such excess liquid occurs in a machine having filter drums, it flows even into the filter trough, in consequence of the curved surface, and dilutes the filter solution in an objectionable way. Further, because of the passage of a surplus of washing liquid, smaller or greater portions of the cake are washed away and carried off so that rills are produced in the cake. In consequence of the smaller resistance at this point the main quantity of all the washing liquid escapes through the rills. Therefore the filter cake is badly and unequally washed out.

It is already known to use washing belts or bands covering the filter cake during the washing process and consisting of a more or less coarse, pervious tissue. These washing bands equalize the distribution of the washing liquid. They may also absorb and, so to speak, store a small quantity of washing liquid if they are thick enough, so that they may transiently equalize small fluctuations of the supply of washing liquid. The storing effect, however, is small as these washing bands cannot be made of any thickness for practical reasons.

The present invention relates to the problem of warranting a washing out of the filter cake by means of a thick layer of washing liquid. According to this invention the washing band is constructed in such a way that it may receive a layer of washing liquid of any thickness and the entire layer may be secured against lateral flowing off. For this purpose the washing band is provided with cells running in the same direction and angularly to the plane of the band, and dividing the layer of washing liquid into separate, i. e. discrete, columns of liquid. If such washing band has a sufficient thickness—which may be made without difficulty—a layer of washing liquid of a thickness corresponding to the thickness of the washing band may be provided above the filter cake merely by filling the cells of the washing band, which are arranged almost normal to the filter cake. By the great number of cells, the walls of which must naturally be more or less tight, the washing liquid contained in the washing band is prevented from flowing off. In this way a sufficiently high column of washing liquid above every portion of the filter cake is always secured so that during the washing process each liquid particle sucked from the filter cake may be immediately replaced by a corresponding one of the liquid column standing above every portion of the filter cake. In other words, the volume of each discrete column of liquid is at least equal to the volume of liquid removed from that portion of the filter cake which it overlies. In this way the danger of cracks in the filter cake resulting from shrinkage of the volume of the cake is avoided. Heretofore it has been impossible to obtain a closed cover of washing liquid above the portion of the filter cake to be washed out, because the pores or passages were entirely irregular, and communicated with each other.

The shape and the size of the cells can be varied. The cells may be relatively large, having the shape of neighboring square or rectangular troughs. In every case the washing band, according to the invention, receives a multiple of volumes of washing liquid compared with known porous washing bands.

According to a further feature of the invention the volume of the cells is of considerable importance. So far as it concerns only security against flowing off of the washing liquid layer, it would suffice, in connection with a drum filter, to give each cell such a size that the cells always act as a frame to cover the portion of the filter cake to be washed by them. For that purpose very large cells, i. e. a limited subdivision into a few columns of washing liquid, would be sufficient. If, however, in such event a crack occurs anywhere in the filter cake or if the filter cake is too thin at any place, the greatest portion of the washing liquid held by the very voluminous cell would flow off through the crack. This would tear away portions of the filter cake and the disadvantages mentioned above would occur. Therefore it is also an essential feature of the invention that in instances where the filter cake cracks easily, a maximum subdivision of the washing band into single cells should be made. As a result, if then the washing liquid flows off from a cell through a crack in the filter cake more rapidly than normally, the other neighboring portions of the filter cake are not influenced with respect to the washing process. In this way the neighboring cells warrant a washing process independent of the crack. Because of this additional feature of the invention the field of employment of the cellular washing band is enlarged. Thus the invention may also be used in cases where the problem of holding the washing liquid layer has already been solved, as, for instance, in connection with simple suction filters. Here the subdivision into cells is of importance to prevent the greatest portion of the washing liquid flowing off unused if the filter cake cracks. In this case the other parts of the filter cake are washed out scarcely or not at all.

Further details and advantages of the invention are to be seen from the following specification.

In the drawings:

Fig. 1 is a diagrammatic view in section through a filter drum with a washing member or band adapted to carry out the method of my invention.

Fig. 2 is a sectional view through a portion of the washing member on the cake showing the reduced effect of a crack in the cake when using my invention.

Fig. 3 is a sectional view through portions of washing members according to my invention while inclined at an angle to the horizontal, showing large, medium and narrow cells.

Fig. 4 shows a portion of a washing member according to my invention on a curved moving filter bed with the cells inclined to the normal to the plane of the member.

Fig. 5 is a view similar to Fig. 2 showing a filter cake having an irregular surface and liquid-pervious absorptive material in the bottom of the cells.

Fig. 6 is a view in perspective of part of a washing member according to my invention made of hinged sheet metal.

Fig. 7 is a view in perspective of part of another sheet metal embodiment of my washing member in which no hinges are used.

Fig. 8 is a view in section through the embodiment of Fig. 7 taken in a plane parallel to the surface of the member and on the line A—B of Fig. 7.

Fig. 9 is a view in perspective, partly in section, of part of a rubber embodiment of my washing member in position on an inclined portion of a cake.

Fig. 10 is a view similar to Fig. 1 showing my invention employed to both wash and remove the filter cake.

In Fig. 1 the cellular washing band according to the invention is provided on a filter drum of known construction. The filter drum 1 dips into the trough 2 containing the liquid to be filtered, the cellular arrangement of the drum with controlling head, etc. being omitted for the sake of simplicity. The produced filter cake is washed out while on the upper part of the drum 1 embraced by a washing band 3 guided over rollers 4. The washing liquid is fed in a usual way by distributing pipes 5 or the like. These pipes are near one end of the movement of the predetermined path of travel of the filter cake where the filter cake is washed. They serve to store discrete amounts of washing liquid in superimposed relation to the filter cake by means of the cells in the washing member or band. The cake and band with the superposed discrete columns of liquid move in a convex path to wash each unit of the filter cake by the discrete column overlying that unit. The washing band has, as is seen from Fig. 2, separate cells 6 extending normal or under any suitable inclination to the plane of the band. The band 3 is relatively thick so that a layer of washing liquid having a thickness of some centimeters may be maintained over the filter cake by filling the cells 6 correspondingly, without the washing liquid being able to flow off in any direction from the upper circumference of the drum 1. The filter cake is therefore washed out with the main supply of the washing liquid being permanently shut off as known from the laboratory when a filter funnel is being used. It will be seen that the washing member comprises a multiplicity of individual, open-ended, adjacent cells of substantial height defined by spaced side walls disposed at an angle to the plane of the cake. The lower open ends of the cells completely cover an entire area of a common surface of the cake, with the lower ends of the cell-defining walls in sealing contact with the common surface of the cake. Thus each pipe can be considered as in a filling zone and after the cake and band move out of the filling zone they complete delivery of the washing liquid to the common surface of the filter cake beyond the filling zone in a plurality of separate and uniform columns through substantially the entire area of contact between the band and the common surface of the filter cake. This completes the delivery to each unit amount of the filter cake of a discrete amount of liquid overlying that unit at that point. If a crack 8 occurs in the filter cake 7 more washing liquid flows off from the corresponding cell 6 and the liquid level sinks as indicated by the reference numeral 9 (see Fig. 2). However, it may never happen that, as heretofore, the greatest portion of the washing liquid simply runs from the entire surrounding reach, or from the entire washing zone, to the crack, and flows off through it, whereby further portions of the filter cake are torn away. On the contrary, when using my invention the washing process continues wholly undisturbed in the cells neighboring the cracked cell and also in the other cells. This function of the cell construction is of importance in all kinds of filters. In the case of simple suction filters of sufficient size according to the invention, simple cell frames are used which are put on the suction filters or the filter cake, respectively, during the washing process.

In connection with filter drums the invention has still another advantage. The action of the cells enables one to wash out the filter cake in a degree not attainable heretofore when using filter drums. As known, the degree of washing out of a filter cake depends mainly upon the quantity of washing liquid sucked through the filter cake, provided that the other conditions such as the temperature, viscosity, resistance of the filter medium and filter cake, pressure difference, etc. are equal. By the thick layer of washing liquid in this respect a large quantity of liquid is sucked through; and further, the extent of the washing zone is considerably enlarged by the new construction of the washing band. In the known filter drums the washing zone extends only for a small space from the vertex of the drum to both sides, because the curvature of the drum rapidly becomes so sharp that the washing liquid runs only into the filter trough. This would occur if the washing zone were too broad, in spite of the porous washing bands. In the present case, however, the washing zone may be extended very far to both sides of the vertex of the drum.

As can be seen from Fig. 3, the washing liquid cannot flow out of the cells 6 if the cellular washing band has an inclined position, provided that the cells are not filled to the brim. Notwithstanding, that the liquid level in the single cells 6 is somewhat inclined, the complete layer of washing liquid is available. In Fig. 3, on the left hand side, relatively voluminous cells 6 are illustrated and it can be seen that the loss of liquid in the cells is relatively inconsiderable. The narrower the cells 6 the higher remains the layer of washing liquid in spite of the inclined position, as can be seen from the smaller cells 10 in Fig. 3. If the smallest cells 11 of this figure are used, practically the complete filling remains in the cells even if the surface of the filter cake is considerably inclined. This advantageous effect of the invention may be further increased by cells arranged inclined within the washing band. Fig. 4 shows that the filter cake on a filter drum may be charged with washing liqiud even if it is far below the horizontal middle plane 12 of the filter drums, provided that the cells 13 are correspondingly inclined relatively to the cake layer or the plane of the washing band. Therefore, as also may be seen from Fig. 1, the cellular washing band embraces a very wide reach of the circumference of the drum. The washing zone is found over about 135° of the circumference of the drum. In consequence of such a wide reach of the washing zone a complete washing out of the filter cake may be attained under otherwise unfavorable circumstances.

Fig. 5 shows two further details of the invention. Sometimes a filter cake occurs having a very irregular surface. In such a case the shutting off of the lower end of the cells by the filter cake layer 14 may be doubtful, although such shutting off is of importance for the action of the invention. To avoid such drawback the cellular washing band is impressed so far into the filter cake that a tightening of the single cells themselves, as well as relatively to the other ones, is secured. Also in connection with even filter cakes the washing band may be slightly impressed for tightening purposes, as otherwise the washing liquid could flow off, especially from the cells lying on the edge of the washing band.

It may be suitable to fill the cells more or less with a liquid-pervious absorptive material 15 such as felt, for the double purpose of preventing any still perceptible jarring and rinsing effect of the drops and jets of the washing liquid on the filter cake, and of diminishing the hydrostatic pressure of the liquid column acting on the filter cake. This improves the tightness between the washing band and the filter cake.

The cellular washing band according to the present invention may be constructed in different ways. According to Fig. 6 the cells are manufactured of thin sheet metal (about 0.3 mm. in thickness). Two by two strips 16 of sheet metal having a height of about 60 mm. and a length corresponding to the breadth of the filter drum are connected with each other by zig-zag-like bent strips 17 of sheet metal having the same height. The strips 16 are parallel to each other on the curved filter bed or drum and inclined relatively to the band for about 45°, and the members of the zig-zag-like bent strip running in the longitudinal direction of the band have a distance from each other of about 30 mm. All cages are formed in this way and contain a plurality of cells connected with each other by hinges 18 at the top so that an articulated band is formed having a length of about 14 mm., a height of about 60 mm. and a breadth corresponding to the breadth of the filter drum. A band of such dimensions is adapted for a filter drum having a breadth of 1.5 meters. In the walls of the cells, in certain cases, overflow openings 19 for the washing liquid are provided whereby a certain adjustment of the washing liquid within the washing band may take place.

Another embodiment of the invention is shown in Figs. 7 and 8. This construction does not use hinges. The intermediate walls 20 are formed by zig-zag-like bent strips of sheet metal which are riveted or welded to the cross walls 21 at 22 in such a way that the whole cellular washing band is sufficiently flexible to adapt to the circumference of the drum and to be guided around the guiding rollers.

Instead of the plurality of cells arranged side by side and behind each other and connected to a band, one may employ bands consisting of thick, flexible, permeable or absorptive material such as rubber, in a given case as a kind of rubber sponge, similar to a known construction of washing bands. Such a washing band is shown in Fig. 9. In contradistinction to the known constructions, the cells, pores or channels 23 of the washing band consisting of rubber and containing the washing liquid run only in a direction crossing the plane of the washing band so that the washing liquid fed to them cannot distribute within the band, but discrete columns of liquid exist delivering their liquid particles only to the units of the filter cake which they overlie. For the purpose of strengthening the walls of the cells 23, insertions 24 of a stronger material such as linen are made.

The cellular washing band may be laid on a filter cake in a continuous way with filter drums as well as with other filters (e. g. plane filters or filter bands) and charged with washing liquid. The washing band is removed after having delivered its liquid content to the filter cake lying thereunder. The filter drum with a cellular washing band provides in an ideal way both the simplicity and working reliability of an approved filter construction, with the remarkable advantages of the characterized washing method. Generally the height of the washing liquid in the cellular washing band may amount to triple or quadruple, or more, compared with the height of the washing bands employed up to now. Essential advantages are reached by the cellular washing band also in connection with suction filters and similar simple filter devices.

It is further possible according to the invention to employ the cellular washing band simultaneously for removing the filter cake as shown in Fig. 10. The filter cake filtered from the filter trough 25 to the filter drum 26 is embedded in the cells of the washing band 27 guided around the drum. The washing process takes place on the upper part of the drum and after the band has left the drum the filter cake is blown out by compressed air fed through a nozzle 28. It is noted that mechanical means may be used for that purpose. So-called reinforcing bands for the filter cake are known running with the filter cake around the drum and being drawn off from the upper face of the drum for the purpose of obtaining deposit of the cake therein. Many suggestions have been made in this respect. In most cases, these reinforcing or removing bands have been made of light wire meshes. Also, single cords running side by side are known for that purpose. According to the present invention, however, such cake removing band is simultaneously used as a washing band. In certain cases the filter cake may be removed from the band by heating. for instance if paraffin-like materials are filtered. The filter cake may then be fused off by heating. Compressed liquid may sometimes be used in place of compressed air.

Having thus particularly described the nature of my invention and the manner in which the same is to be performed, what I wish to have covered by Letters Patent is:

1. A method of washing a filter cake formed on a curved moving filter bed during a part of its movement over a predetermined path of travel on said filter bed which comprises the steps of storing in superimposed relation to the filter cake and near one end of its path of travel after the cake is formed on said filter bed discrete amounts of washing liquid sufficient in volume to wash unit amounts of the formed filter cake, and moving the underlying filter cake and the superimposed washing liquid in a convex path to cause a complete washing of each unit amount of the filter cake by the discrete amount of washing liquid overlying that unit of said filter cake.

2. A method of washing a filter cake formed on a movable bed filter which comprises the steps of superimposing upon said cake a member adapted to move therewith and comprising wholly a multiplicity of individual, open-ended, adjacent cells of substantial height defined by spaced side walls disposed at an angle to the plane of said cake, the lower open ends of said cells completely covering an entire area of a common surface of said cake with the lower ends of the cell-defining walls in sealing contact with said common surface, filling each cell with a separate liquid column of a volume at least equal to the volume of the liquid removed from that portion of the cake underlying that cell, and thereafter completing the washing of said portion with the separate liquid from the overlying cell.

3. In a method of washing a formed filter cake according to claim 2, the step of passing the separate liquid columns through liquid-pervious absorptive material disposed within each cell, whereby the filter cake is not disturbed by the washing liquid as it passes from said cells and through said filter cake and the hydrostatic pressure of the columns is reduced thereby maintaining the sealing contact between the lower ends of said cell-defining walls and the said common surface of said filter cake.

4. A method of washing a filter cake formed on a movable bed filter which comprises the step of superimposing in sealing contact upon a common surface of the formed filter cake while said cake is convexly arranged a band adapted to move with said convexly arranged filter cake and comprising wholly a multiplicity of individual, open-ended, adjacent cells each of substantial height uncovered at the upper ends and each defined by spaced side walls disposed at an angle to the common surface of said filter cake, then the steps of filling each cell at a filling zone with a separate liquid column of a volume at least substantially equal to the volume of the liquid removed from that portion of the cake underlying that cell, and thereafter the step of completing delivery of said washing liquid beyond the filling zone to said common surface of the filter cake in a plurality of separate and uniform columns through substantially the entire area of contact between the band and the common surface of the filter cake, then repeating the filling and delivering steps; the total volume of liquid supplied to each cell completing the washing of that portion of the filter cake underlying that cell.

5. A washing member for a filter adapted to press against a filter cake during the washing thereof, said member comprising a multiplicity of individual, open-ended, adjacent cells each of substantial height and defined by relatively thin, spaced side walls adapted to be disposed at an angle to the plane of the filter cake during the washing thereof with the lower ends of the cell-defining walls in sealing contact with a common surface of the filter cake, each of said cells adapted to receive therein a substantial column of washing liquid of a volume at least sufficient to effect complete replacement of the liquid in that portion of the filter cake underlying that cell, said cells being adapted to subsequently deliver said washing liquid to said common surface of the filter cake in a plurality of separate and uniform liquid columns to substantially the entire area of contact between said member and the common surface of the filter cake, and a liquid-pervious material partially filling each of said cells to retard the flow of liquid therethrough.

6. A washing member for a filter adapted to press against a filter cake during the washing thereof, said member comprising a multiplicity of individual, open-ended, adjacent cells each of substantial height and defined by relatively thin, spaced side walls adapted to be disposed at an angle to the plane of the filter cake during the washing thereof with the lower ends of the cell-defining walls in sealing contact with a common surface of the filter cake, each of said cells adapted to receive therein a substantial column of washing liquid of a volume at least sufficient to effect complete replacement of the liquid in that portion of the filter cake underlying that cell, said cells being adapted to subsequently deliver said washing liquid to said common surface of the filter cake in a plurality of separate and uniform liquid columns to substantially the entire area of contact between said member and the common surface of the filter cake, in combination with hinges joining the upper ends of said cell-defining side walls and extending in a direction transversely across the said washing member, whereby said washing member can conform to a reversely curved surface without distortion of said cell-defining walls.

References Cited in the file of this patent

UNITED STATES PATENTS

| | | |
|---|---|---|
| 2,202,932 | Tingey | June 4, 1940 |
| 2,455,409 | Dickey | Dec. 7, 1948 |
| 2,481,110 | Greenawalt | Sept. 6, 1949 |